Jan. 18, 1955     F. E. SMITH ET AL     2,699,907
AIRCRAFT FUEL PUMP ASSEMBLY

Filed Feb. 25, 1949     2 Sheets-Sheet 1

Inventors
Frederick E. Smith
Rune S. Hellman
By The Firm of Charles W. Hills Attys Jan. 18, 1955

F. E. SMITH ET AL 2,699,907

AIRCRAFT FUEL PUMP ASSEMBLY

Filed Feb. 25, 1949

Inventors
Frederick E. Smith
Rune S. Hellman
By The Firm of Charles W. Hills Attys

United States Patent Office 2,699,907
Patented Jan. 18, 1955

2,699,907

AIRCRAFT FUEL PUMP ASSEMBLY

Frederick E. Smith, Cleveland Heights, and Rune S. Hellman, University Heights, Ohio, assignors to Thompson Products, Inc., Cleveland, Ohio, a corporation of Ohio Application February 25, 1949, Serial No. 78,442

4 Claims. (Cl. 244—135)

This invention relates to multiple pump assemblies and specifically deals with assemblies having a single prime mover operating a plurality of pumps.

The invention will hereinafter be specifically described as embodied in electric motor-driven submerged type pumps for airplane fuel systems, but it should be understood that the principles of this invention are broadly applicable to multiple pump assemblies, particularly assemblies having a plurality of pumps driven by a single motor.

In airplane fuel systems it is desirable to pressure fuel from the supply tank or fuel cell into the fuel line feeding the engine-driven fuel pump, the pressuring of fuel to the engine-driven fuel pump being particularly desirable when the aircraft is performing at relatively high altitudes.

Difficulties have been encountered in the pressure feeding of fuel at high altitudes due to the volatile nature of the fuel. With such fuel, vapor and gaseous bubbles form in ever increasing amounts with increased altitude. Centrifugal type booster pumps have been successfully used for bubble separation and for pressuring the aircraft fuel into the fuel line to the engine-driven fuel pump. These centrifugal type booster pumps have also been successful in supplying fuel to the aircraft engine during periods when the engine-driven fuel pump is inoperative due to damage and during other periods when the engine-driven fuel pump is not supplying pressured fuel, as when the engine is being started.

Another difficulty has been encountered in pressuring fuel to the engine of the highly maneuverable war type aircraft. The modern war-type aircraft is designed to perform at high altitudes in inverted flight conditions, to make steep climbs at high rates, and to perform an accelerated power dive wherein the vertically downward component of the acceleration is greater than the acceleration due to gravity. During the aforedescribed flight operations of the aircraft, fuel in a partially filled fuel cell will "climb" to the top of the cell or be withdrawn to a region remote from the booster pump inlet which is generally located adjacent the bottom wall of the fuel cell.

According to this invention, an electric motor-driven centrifugal type booster and vapor separating pump mountable within a fuel cell adjacent the lower wall thereof is equipped with another centrifugal type pump mounted above the motor, and both pumps are driven by the same motor. Both pumps operate to pressure fuel during normal flight of the aircraft, but during the periods of extraordinary flight operations described above, fuel is withdrawn from the vicinity of the inlet of the lower centrifugal pump. The upper pump will still be submerged in fuel which collects in the upper regions of the fuel cell and will operate to pressure fuel to the engine-driven fuel pump under pressure substantially equal to the pressure supplied when both pumps are operating. This is possible due to speeding up of the electric series wound motor when fuel is withdrawn from the impeller of the lower pump.

It is, then, an object of this invention to provide a motor-driven multiple vapor separating pump assembly having two different types of pump impellers at different levels for acting upon liquid at such levels.

Another object of the invention is to provide a combination booster pump unit adapted to be submerged in an airplane fuel cell and containing a centrifugal type bubble-separating and pressuring pump and a second centrifugal type pump driven by a single electric motor.

A still further object of the invention is to provide a multi-pump and motor unit disposed within an aircraft fuel cell so that one of the pumps will be submerged in fuel during extraordinary flight operations of the aircraft.

Another object is to provide a vapor separating pump assembly wherein a first pump receives fuel at a low level through a bottom inlet and a second pump receives fluid at a higher level through a top inlet.

A specific object of the invention is to provide a dual pump and motor unit whereby liquid may be pumped under substantially equal pressures when both pumps are submerged in fuel or when only one pump is submerged in fuel.

Other and further objects of the invention will be apparent to those skilled in the art from the following detailed description of the annexed sheets of drawings which, by way of preferred example only, illustrate one specific embodiment of the invention.

On the drawings:

Figure 1a shows the circuit connections for the motor M when a straight series field $a$ is employed.

Figure 1b is a circuit diagram showing the field windings $b$ for the motor M when a compound motor is employed.

Figure 1c is a circuit diagram showing the field windings $c$ for the motor M when a shunt field is provided.

Figure 1d shows the speed-load curves for the respective motors of Figures 1a, 1b and 1c.

As shown on the drawings:

Figure 1:
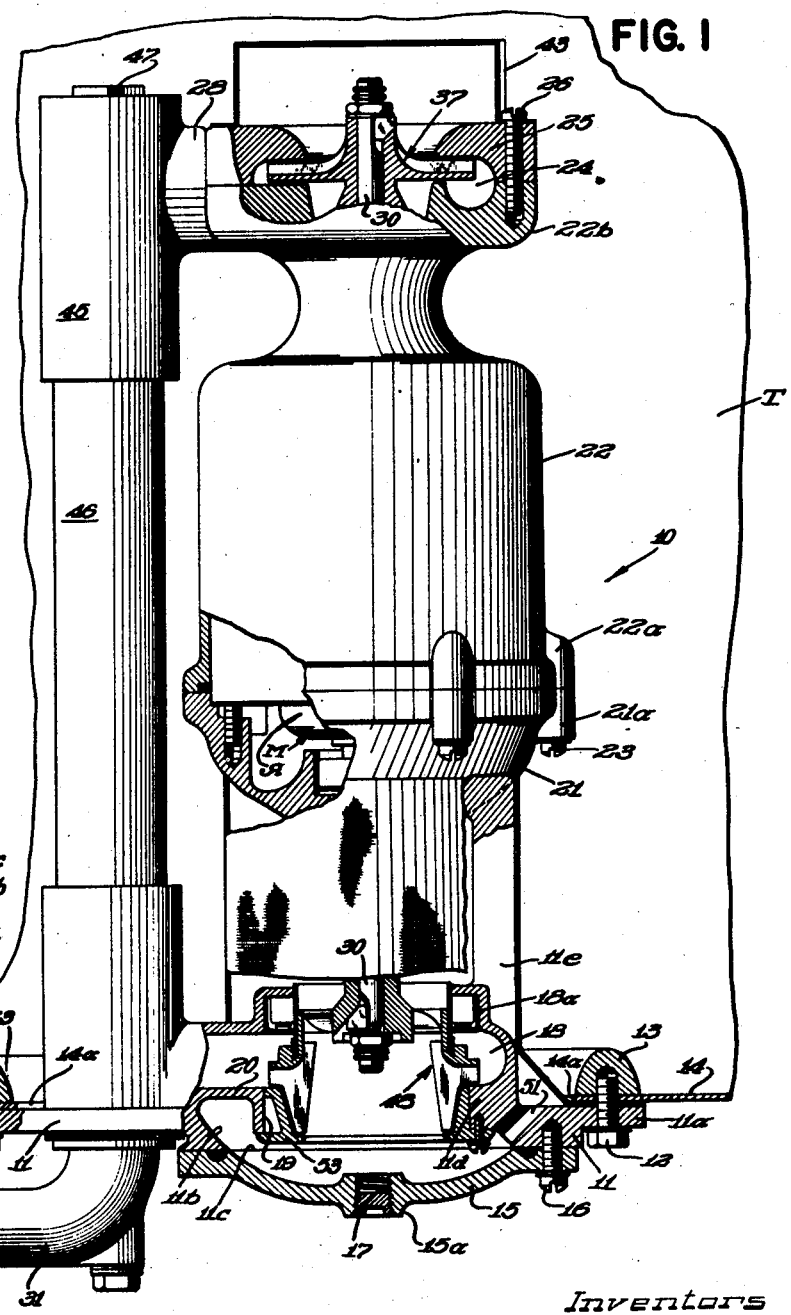
Figure 1 is a side elevational view, with parts in vertical cross section, of a multiple booster pump motor unit according to this invention, the unit being mounted on the bottom wall of a tank or cell and projecting into the tank or cell to be submerged in fluid therein.

In Figure 1, the reference numeral 10 designates generally a combination multiple pump and single electric motor unit according to this invention. A base plate 11 of the assembly has an apertured mounting flange 11a around the periphery thereof receiving cap screws 12 therethrough. The cap screws 12 are threaded into a mounting ring 13 on the bottom wall 14 of a tank T around an aperture 14a in the bottom wall. The screws 12 pass through the tank wall around the aperture 14a and a gasket (not shown) can be interposed between the base 11 and the tank wall 14 to prevent leakage.

The base 11 has a tapered wall section 11b converging to a large opening 11c at a level below the tank or cell wall 14. This opening 11c is closed by a concave cap 15 bolted to the base 11 as by cap screws 16. The cap 15 has a central boss portion 15a defining a drain outlet closed by a plug 17.

Fins connect the base 11 with an annular centrifugal type pump casing 11d defining a volute chamber 18 and a seal chamber 18a around and in communication with central open ended passageway 19. The pump casing 11d has a peripheral discharge conduit 20 extending laterally from the volute 18.

One or more upstanding posts 11e extend from the top of the pump casing 11d to carry a support ring 21 in spaced relation above the casing. An inverted cup-like casing 22 has the open bottom end thereof mounted on the ring 21 and secured thereon by cap screws 23. The cap screws 23 pass through circumferentially spaced lobes 21a on the ring 21 and are threaded into similar lobes 22a on casing 22. A motor M is mounted in the casing 22 and has an armature A driving pump shafts which extend from the top and bottom ends of the casing.

The top of casing 22 has a reduced diameter tubular neck diverging radially at its top end to provide a pump casing 22b having a volute chamber 24. A throat ring member 25 is secured to the top of the casing 22b as by cap screws 26 to provide an open topped pump inlet. In a manner similar to the lower pump, the upper pump volute 24 discharges into a laterally projecting passage 28.

The armature A has a drive shaft 30 which extends upwardly for driving the upper pump impeller and downwardly for driving the lower pump impeller. During ordinary aircraft operations both pumps will be submerged in the fuel to the fuel cell and both pumps operate to pressure fuel to the engine driven fuel pump. The lower pump discharge passage 20 and the upper pump discharge passage 28 pass fuel into the fuel line 31 to the engine-driven fuel pump (not shown).

The upper pump assembly

Figure 2:
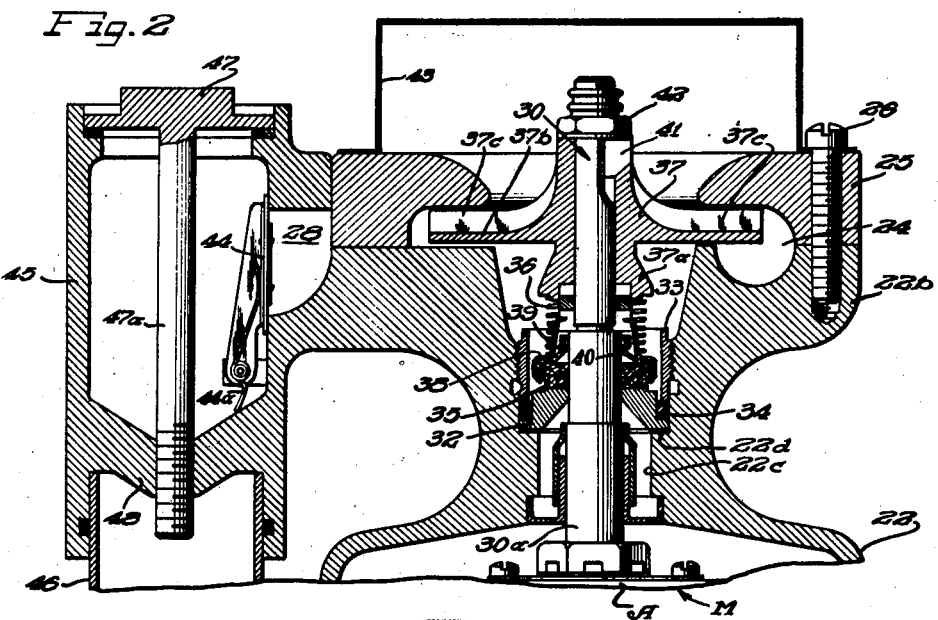
Figure 2 is a vertical cross-sectional view of the upper pump of the unit.

The operation of the upper pump may be best understood with reference to Figure 2. The upper portion 30a of the motor shaft 30 passes through a passageway 22c in the neck of casing 22. A shoulder 22d in the passage 22c receives a seal ring 32 loosely embracing the shaft 30a and fixedly held against the shoulder 22d by a threaded sleeve 33 which is threaded into the casing 22b and thrusts against a rubber ring 34 acting on the seal ring 32. A rotating seal ring 35 rides on the thus held stationary ring 32 and is spring urged against the ring 32 by means of a coil spring 36 surrounding the shaft and abutting the hub portion 37a of a flat disk type impeller 37. The other end of the coil spring 36 abuts a cap member 38 surrounding seal ring 35. A rubber sleeve 39 is sealingly engaged on the shaft 30a by means of a snap ring 40 and has a diaphragm portion extending over the seal ring 35 and secured about the outer periphery of this ring 35 by the cap 38. Leakage along the shaft 30a is thereby effectively stopped by the diaphragm portion of the rubber sleeve 39 and by the riding contact of the seal rings 32 and 35.

The motor shaft 30a extends upwardly into the throat defined by the throat ring 25 and receives the impeller hub 37a thereon. A key 41 secures the hub for corotation with the shaft 30a. The impeller 37 is secured against axial movement along the shaft 30a by a nut 42 threaded on the upper end of the shaft. The impeller 37 has the hub portion 37a embracing the shaft 30a and has a flat disk portion 37b radiating from the hub 37a to underlie the throat ring and extend into the volute 24. Upstanding spiral pumping vanes 37c are provided on the top face of the disk portion 37b. These vanes 37c have upstanding inner ends merging into the hub 37a of the impeller and spirally radiating outer ends extending under the throat ring 25 so that fuel which enters through the throat may be pumped into the volute 24. The uncovered inner ends of the vanes serve to agitate the fluid entering the pump to release bubbles of gas and vapor therefrom back through the inlet of the pump, and the gas and vapor-freed fluid is then pumped into the volute 24 as more particularly described in the Russell R. Curtis Reissue Patent No. 22,739. An inverted cup shaped screen 43 spans the pump inlet and is secured to the throat ring 25 by the cap screws 26.

A flap valve 44 is pivotally mounted in a conduit casing portion 45 of the casing 22b to be disposed over the mouth of conduit 28. A weak spring 44a acts on the valve 44 to urge the same into position for closing the mouth of the conduit 28.

When the impeller 37 is driven, pressure of liquid in the volute chamber 24 will be sufficient to open the flap valve 44 and discharge liquid under pressure into the casing 45. This casing 45 communicates with the fuel line 31 to the engine-driven fuel pump by means of the conduit 46. The upper end of casing 45 is closed by a cap member 47 which has an integrally formed bolt portion 47a so that it can be threaded into a spider 48 within the casing 45.

The lower pump assembly

Figure 3:
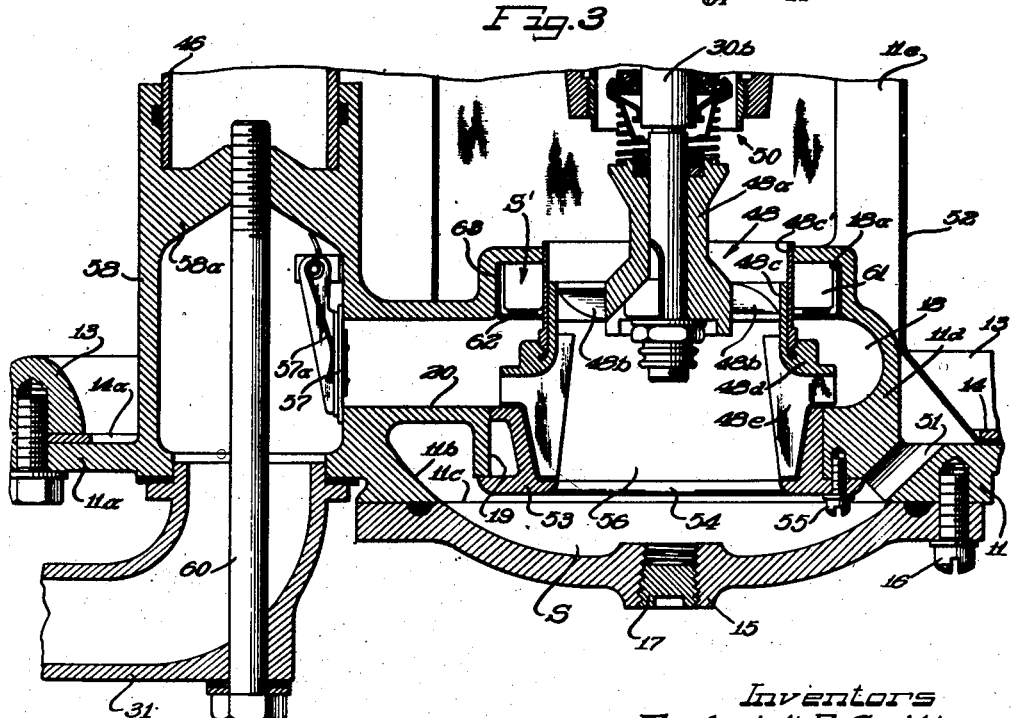
Figure 3 is a vertical cross-sectional view of the lower pump of the unit.

The lower pump assembly is best shown in Figure 3. The lower depending section 30b of the motor drive shaft 30 has an impeller 48 secured to its lower end in a manner similar to the securement of the impeller 37 to the upper end 30a of the shaft 30. A sealing unit 50, to prevent leakage along the lower shaft portion 30b, is identical with the sealing unit described in the upper assembly.

The fuel inlet for the lower pump assembly is provided by a sump S fed from a plurality of circumferentially spaced apertures 51 between the fins connecting the base plate with the casing 11d. A cylindrical screen 52 surrounds the casing 11d and extends between the ring 21 and the base 11 to filter any fluid entering the sump.

A throat ring 53 having a throat opening 54 is secured as by cap screws 55 to the bottom of the pump casing 11d and seats in the passageway 19. The fuel passes through the throat 54 into a central liquids and vapor separating chamber 56.

The impeller 48 has a hub portion 48a keyed to the shaft 30b and vapor dispensing axial flow vanes 48b extend radially from the hub 48a to carry a cylindrical collar 48c spaced in radial relation outwardly from the hub 48a. The collar 48c is surrounded by a sleeve 48c' which extends above the passageway 19. The collar 48c has an outturned flange 48d from which depends a ring of impeller vanes 48e in spaced peripheral relationship. These impeller vanes 48e have outer edges in close operating clearance relation with the throat ring 53 and pump fluid in the volute 18. When the impeller rotates to pump fuel in the volute, the heavier liquid is centrifugally forced outward and the lighter vapors gather nearer the axial portion in the vapor separating chamber 56. The axial flow vanes 48b then pull the vapor rich fluid through the sleeve 48c' to be discharged back into the fuel cell. A seal S', hereinafter described, is provided in the chamber 18a around the sleeve 48c'.

A flap valve 57 is pivotally mounted on the casing 11d and is urged by a weak spring 57a for closing the mouth of the conduit 20. In a manner similar to the upper pump assembly, when the lower pump impeller 48 is driven by the motor drive shaft 30 to pump fluids through the volute 18, the pump discharge pressure will open the flap valve 57 so that fluids can enter the casing portion 58 which communicates with the conduit 46 and the upper casing 45 and which also communicates with the fuel line 31 to the engine-driven fuel pump (not shown).

A bolt 60 secures the fuel conduit 31 to the base 11 in registration with the bottom of the casing portion 58. The bolt 60 is threaded into a spider 58a within the casing 58 as shown in Figure 3.

The seal S' includes a carbon or the like seal ring 61 receiving the sleeve 48c' in rotatable sealing relation therein. The ring 61 is spring pressed against the top of the chamber 18a by a spring washer 62 and a centrally apertured metal cup 63 is pressed into the chamber 18a to bottom the washer 62 and to separate the seal chamber 18a from the volute 18.

During ordinary operation of the aforedescribed pumping units and motor, both the upper impeller 37 and the lower impeller 48 are rotated by the drive shaft 30 of the motor M and deliver the fuel to the fuel line 31 at a substantially constant pressure. However, the bottom impeller 48, due to its superior vapor removing efficiency, is hydraulically inefficient and imposes a relatively heavy load on the motor M. The top impeller 37, on the other hand, takes less power to operate but does very little pumping at low speeds, since it is designed to operate at higher speeds than the lower impeller 48.

When only the upper pump is submerged in fluid, the fuel pressure in the fuel line 31 is substantially the same as when both pumps are submerged, due to the speed up of the motor M and high speed efficiency of the upper impeller 37. The fuel pressure within the fuel conduit 46 will hold either flap valve 44 or 57 closed until the discharge pressures in the respective pumps exceeds the pressure in the conduit, so that no bleed back through a pump can occur.

From the above description it will be understood that the invention now provides multi-pump and motor units adapted to be submerged in airplane fuel cells wherein both pumps are of the centrifugal type to be directly operated from a single electric motor without the use of expensive clutches, gears, etc. During normal operation of the aircraft, both pumps operate simultaneously to pressure fuel to the engine-driven fuel pump, the lower pump being particularly effective for separating gases and for pumping fully liquid fuel at moderate speeds so that the top pump does very little work. During extraordinary flight operation when the lower pump is not submerged, the series wound motor M speeds up due to the reduced load thereon and drives the upper pump at higher speeds where it is very effective to maintain the desired booster pressure on the fuel fed to the engine-driven pump.

Any electric motor which will speed up when loads thereon are reduced is effective. If a very pronounced speed-up is desired, a straight series wound motor is useful (Figure 1a). If a moderate speed-up is desired, a compound motor with the accent on the series winding is effective (Figure 1b). If only a small amount of speed-up is desired, a compound motor with a strong shunt field, or a shunt motor with a weak field are satisfactory (Figure 1c).

To minimize the likelihood of the motor "running off" when both pumps are uncovered, as when the tank is dry, a compound motor with emphasis on the series field is better than a series field motor. In a tested installation, when both pumps were submerged, a motor speed of 5800 R. P. M. (point x Figure 1d) maintained discharge pressures of 6.4 p. s. i. and when the bottom pump was uncovered the motor operated at 7100 R. P. M. (point y Figure 1d) to maintain pressures of 6.2 p. s. i. When the top pump was uncovered, the motor ran at 6100 R. P. M. to maintain a pump pressure of 5.3 p. s. i.

At higher speeds, the top pump was even more efficient. Thus, when the motor was driven at 7750 R. P. M. with both pumps submerged, a discharge pressure of 13.0 p. s. i. was maintained. When the bottom pump was uncovered, the motor speed increased to 9200 R. P. M. to maintain a pump pressure of 15.9 p. s. i. When the top pump was uncovered, the motor ran at 8300 R. P. M. to maintain a pump pressure of 13.5 p. s. i. These results show that satisfactory booster pressures are maintained automatically as fuel level conditions vary in the fuel cell.

It will also be understood that the units of this invention can be completely inoperative without stopping flow of fuel from the tank or fuel cell to the fuel line, since fuel can always flow through the impeller and casing of each of the pumps. The weak springs on each of the flap valves which urge the valves to closed position will readily permit the valves to open whenever there is a suction pull in the fuel line, as when the engine-driven fuel pump is operative and the pumping units of this invention are inoperative.

It will be further understood that various details of construction may be varied through a wide range without departing from the principles of this invention and it is, therefore, not the purpose to limit the patent granted hereon otherwise than necessitated by the scope of the appended claims.

We claim as our invention:

1. In an aircraft fuel system, a fuel cell, two pumps disposed in said cell having means providing separate pump inlets in vertically spaced relation at different levels in said cell, an electric motor having an armature rotatable in a magnetic field, circuit means connecting said motor in circuit with a supply voltage to energize said armature and said field with the counter electromotive force in said armature increasing relative to the strength of said magnetic field as the mechanical load on said motor is decreased, coupling means directly coupling both of said pumps to said motor under all conditions of flight to concurrently impose mechanical load on said motor, and said means providing said separate pump inlets at different levels in said cell unloading the pump having the lowermost pump inlet under negative gravity flight conditions when fuel rises towards the upper portions of the cell, thereby reducing the mechanical load on said motor, for increasing the rotational speed of the pump having the uppermost pump inlet.

2. In an aircraft fuel system as defined in claim 1, one of said pumps having a disc-type impeller, the other of said pumps having a ring-type bubble separating impeller.

3. In an aircraft fuel system as defined in claim 2, said disc-type impeller being provided in the pump having the uppermost pump inlet whereby said disc-type impeller will be rotated at increased speed under negative gravity flight conditions when fuel rises towards the upper portions of the fuel cell.

4. In a fuel cell and submerged pump assembly for aircraft, a multiple pump and motor unit for mounting in submerged condition in the fuel cell, said unit having an electric motor with shafts extending from opposite ends thereof, pumps mounted on the ends of said motor each having an impeller directly connected to a corresponding one of said shafts for continuous rotation with said motor, each of said pumps having an open inlet adapted to communicate with fuel in said cell, a common outlet for both of said pumps adapted to discharge out of the fuel cell, means mounting said unit in an upright position to place said inlets at different levels in the cell whereby one of said inlets will be submerged in liquid in the cell when the liquid rests on the bottom of the cell under positive gravity flight conditions as well as when the liquid rises towards the top of the cell under negative gravity flight conditions, said electric motor having an armature rotatable in a magnetic field, circuit means connecting said motor in circuit with a supply voltage to energize said armature and said field with the counter electromative force in said armature increasing relative to the strength of said magnetic field as the mechanical load concurrently imposed upon said motor by both of said two impellers is decreased for automatically increasing the rotational speed of said motor and the loaded one of said impellers when the other impeller is selectively unloaded because only one inlet is submerged in fuel.

References Cited in the file of this patent

UNITED STATES PATENTS

| | | |
|---|---|---|
| 1,845,136 | Dieter | Feb. 16, 1932 |
| 2,083,167 | Lamere | June 8, 1937 |
| 2,316,007 | Lockett | Apr. 6, 1943 |
| 2,390,204 | Curtis | Dec. 4, 1945 |
| 2,546,034 | Lansing | Mar. 20, 1951 |
| 2,547,246 | Aspelin | Apr. 3, 1951 |

FOREIGN PATENTS

| | | |
|---|---|---|
| 653,092 | Germany | Nov. 15, 1937 |